(12) United States Patent
Robichaux et al.

(10) Patent No.: US 6,220,987 B1
(45) Date of Patent: Apr. 24, 2001

(54) AUTOMATIC TRANSMISSION RATIO CHANGE SCHEDULES BASED ON DESIRED POWERTRAIN OUTPUT

(75) Inventors: Jerry Dean Robichaux, Riverview; Tobias John Pallett, Ypsilanti; Gary Bruce Webster, Livonia, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/320,012

(22) Filed: May 26, 1999

(51) Int. Cl.[7] ............................. F16H 59/14; F16H 59/26

(52) U.S. Cl. .............................................. 477/97; 477/110

(58) Field of Search ............................. 477/97, 110, 120, 477/107, 111, 76, 98

(56) References Cited

U.S. PATENT DOCUMENTS

| | | |
|---|---|---|
| 4,353,272 | 10/1982 | Schneider et al. . |
| 4,509,124 * | 4/1985 | Suzuki et al. ............................ 701/65 |
| 4,697,561 | 10/1987 | Citron . |
| 4,730,708 | 3/1988 | Hamano et al. . |
| 4,739,483 | 4/1988 | Ina et al. . |
| 4,819,596 | 4/1989 | Yasuoka et al. . |
| 4,825,366 * | 4/1989 | Yamamoto et al. ................ 477/62 X |
| 4,943,921 * | 7/1990 | Baltusis et al. ..................... 477/97 X |
| 4,951,627 | 8/1990 | Watanabe et al. . |
| 5,069,181 | 12/1991 | Togai et al. . |

(List continued on next page.)

FOREIGN PATENT DOCUMENTS

| | | |
|---|---|---|
| 66831/81 | 9/1982 | (AU) . |
| 0 206 091 B1 | 12/1986 | (EP) . |
| 0 340 764 | 11/1989 | (EP) . |
| 0 408 767 B1 | 1/1991 | (EP) . |
| 0 413 031 B1 | 2/1991 | (EP) . |
| 0 557 299 B1 | 10/1991 | (EP) . |
| 0 749 524 B1 | 2/1995 | (EP) . |
| 0 754 888 A2 | 1/1997 | (EP) . |
| 2 154 763 | 9/1985 | (GB) . |
| 2 239 500 | 7/1991 | (GB) . |
| 2 239 683 | 7/1991 | (GB) . |
| 2 312 970 | 11/1997 | (GB) . |
| WO 95/01502 | 1/1995 | (WO) . |

OTHER PUBLICATIONS

"Hierarchial Control Strategy Of Powertrain Functions", by H.M. Streib et al, 24. FISITA Congress, London Jun. 7–11, 1992, pp. 1–11.

"Torque–Based System Structure of the Electronic Engine Management System (ME7) as a New Base for Drive Train Systems", by J. Gerhardt et al, 6. Aachener Kolloquim Fahrzeug– und Motorentechnik '97, Oct. 22, 1997, pp. 817–849.

*Primary Examiner*—Charles A Marmor
*Assistant Examiner*—Ha Ho
(74) *Attorney, Agent, or Firm*—Frank G. McKenzie (57) ABSTRACT

A system and method for controlling a vehicular powertrain including an internal combustion engine, an automatic transmission having a plurality of selectable gear ratios, and a controller in communication with the internal combustion engine, the transmission, and an accelerator pedal, include determining a driver requested wheel torque based on position of the accelerator pedal, and determining a vehicle speed ratio changing threshold based on the driver requested wheel torque. In one embodiment, the system and method determine a value indicative of current barometric pressure, determine a current gear ratio, and modify the driver requested wheel torque based on the current barometric pressure and the current gear ratio to determine a compensated wheel torque. The compensated wheel torque is used to determining the ratio changing threshold. Offset values are included to adjust for barometric pressure variation, transmission oil temperature, and to prevent gear hunting or excessive ratio changing.

10 Claims, 5 Drawing Sheets

U.S. PATENT DOCUMENTS

| | | |
|---|---|---|
| 5,078,109 | 1/1992 | Yoshida et al. . |
| 5,086,668 | 2/1992 | Fujiwara et al. . |
| 5,109,732 | 5/1992 | Takizawa . |
| 5,245,966 | 9/1993 | Zhang et al. . |
| 5,304,102 | 4/1994 | Narita et al. . |
| 5,323,318 * | 6/1994 | Hasegawa et al. ............... 477/97 X |
| 5,325,740 | 7/1994 | Zhang et al. . |
| 5,351,776 | 10/1994 | Keller et al. . |
| 5,374,224 | 12/1994 | Huffmaster et al. . |
| 5,398,544 | 3/1995 | Lipinski et al. . |
| 5,407,401 | 4/1995 | Bullmer et al. . |
| 5,408,966 | 4/1995 | Lipinski et al. . |
| 5,408,974 | 4/1995 | Lipinski et al. . |
| 5,431,139 | 7/1995 | Grutter et al. . |
| 5,437,253 | 8/1995 | Huffmaster et al. . |
| 5,445,125 | 8/1995 | Allen . |
| 5,462,501 | 10/1995 | Bullmer et al. . |
| 5,468,196 * | 11/1995 | Minowa et al. .................. 477/97 X |
| 5,484,350 * | 1/1996 | Ishikawa et al. ..................... 477/97 |
| 5,484,351 | 1/1996 | Zhang et al. . |
| 5,496,227 * | 3/1996 | Minowa et al. ................ 477/110 X |
| 5,501,644 | 3/1996 | Zhang . |
| 5,503,129 | 4/1996 | Robichaux et al. . |
| 5,520,159 | 5/1996 | Pao et al. . |
| 5,547,435 * | 8/1996 | Grutter et al. ....................... 477/110 |
| 5,568,795 | 10/1996 | Robichaux et al. . |
| 5,573,476 * | 11/1996 | Minowa et al. ................ 477/110 X |
| 5,575,257 | 11/1996 | Lange et al. . |
| 5,580,330 * | 12/1996 | Minowa et al. ................ 477/110 X |
| 5,580,331 * | 12/1996 | Shiraishi et al. ................ 477/110 X |
| 5,588,178 | 12/1996 | Liu . |
| 5,603,672 | 2/1997 | Zhang . |
| 5,605,131 | 2/1997 | Ohno et al. . |
| 5,606,951 | 3/1997 | Southern et al. . |
| 5,628,706 | 5/1997 | Zhang et al. . |
| 5,680,763 | 10/1997 | Unland et al. . |
| 5,692,471 | 12/1997 | Zhang et al. . |
| 5,743,083 | 4/1998 | Schnaibel et al. . |
| 5,749,063 * | 5/1998 | Sakoniyu et al. ..................... 701/93 |
| 5,896,083 * | 4/1999 | Weisman et al. ............... 477/110 X |

* cited by examiner

AUTOMATIC TRANSMISSION RATIO CHANGE SCHEDULES BASED ON DESIRED POWERTRAIN OUTPUT

TECHNICAL FIELD

The present invention is directed to a system and method for controlling an automatic transmission including scheduling ratio changes based on desired or requested powertrain output.

BACKGROUND ART

Mechanical throttle control systems use airflow as the primary control parameter in controlling engine or powertrain output. The airflow is controlled by a throttle valve in the intake which is mechanically linked to a throttle pedal. As such, many powertrain control parameters, including automatic transmission shift scheduling, were traditionally based on, or indexed by, the throttle valve position.

Electronic airflow control systems, such as variable cam timing systems and electronic throttle control systems, replace the traditional mechanical throttle cable system with an "electronic linkage" provided by sensors and actuators in communication with an electronic controller. This increases the control authority of the electronic controller and allows the throttle valve to be controlled independently of the pedal position. As such, the throttle valve position is no longer necessarily indicative of the requested or desired powertrain output.

SUMMARY OF THE INVENTION

It is an object of the present invention to provide a system and method for controlling a powertrain including an internal combustion engine with electronic airflow control and an automatic transmission which controls the ratio changes (gear shifts and converter clutch locks/unlocks) of the automatic transmission based on a final requested powertrain output.

In carrying out the above object and other objects, advantages, and features of the present invention, a system and method for controlling a vehicular powertrain including an automatic transmission having a plurality of selectable input to output ratios, include determining a requested powertrain output, determining a current vehicle speed, determining a vehicle speed ratio changing threshold based on the requested output torque, comparing the current vehicle speed to the vehicle speed ratio changing threshold, and generating a command to select a different input to output ratio when the current vehicle speed crosses the vehicle speed ratio changing threshold.

The present invention provides a number of advantages over prior art control strategies. For example, the present invention provides a modular control structure where automatic transmission ratio selection is based on powertrain output rather than throttle position. As such, the control strategy of the present invention may be easily adapted to new engine technologies such as lean burn, variable cam timing, and direct injection. Ratio selection which is independent of throttle valve position allows increased authority of control of the throttle valve such that it can be nearly wide open without causing a ratio change. This facilitates stable ratio changes at lower speeds without degrading performance feel.

The above advantages and other advantages, objects, and features of the present invention, will be readily apparent from the following detailed description of the best mode for carrying out the invention when taken in connection with the accompanying drawings.

BEST MODE(S) FOR CARRYING OUT THE INVENTION

Figure 1:
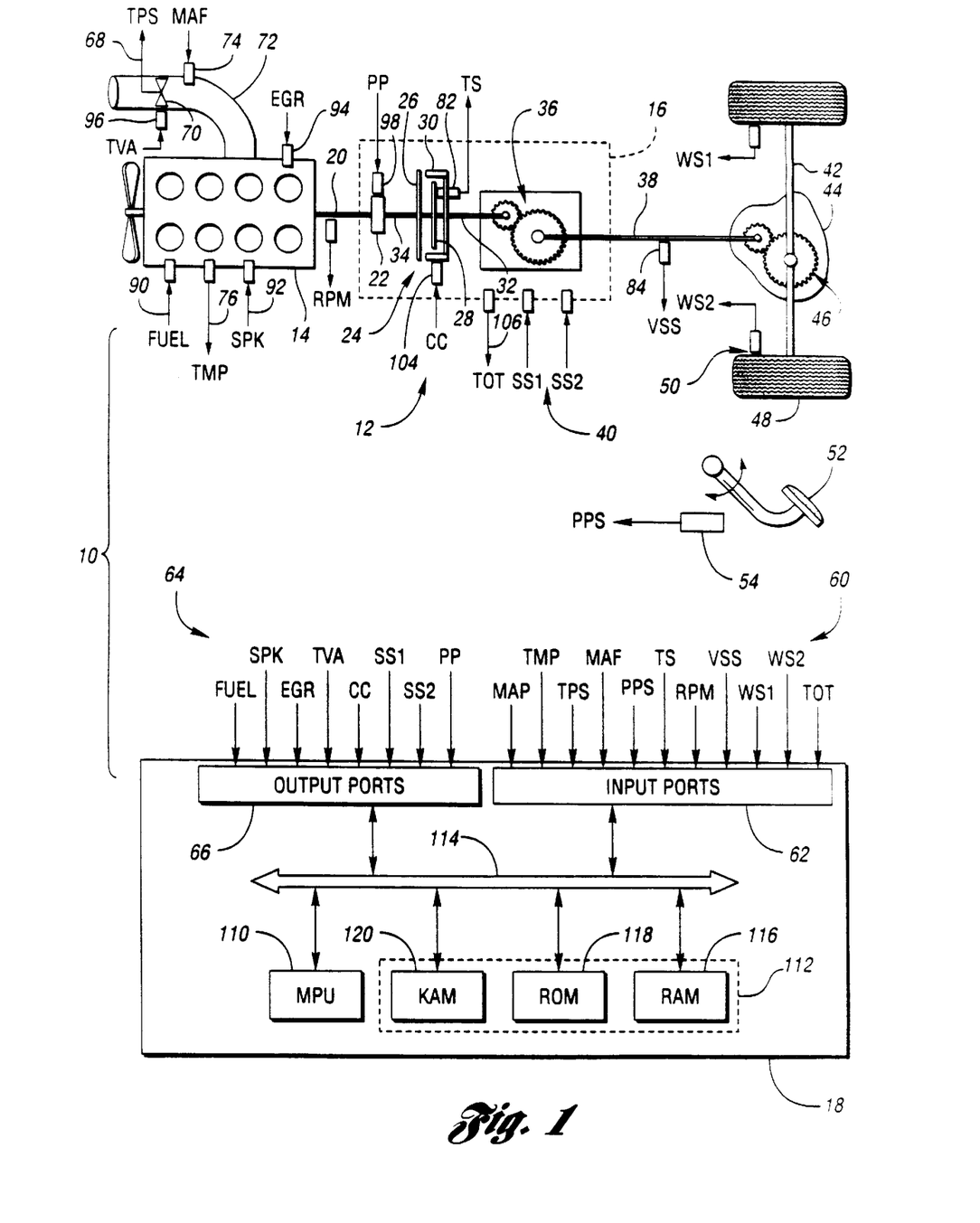
FIG. 1 is a block diagram illustrating a system and method for powertrain output based ratio change scheduling according to the present invention.

FIG. 1 provides a block diagram illustrating operation of a system or method for output based automatic transmission ratio change scheduling according to the present invention. The phrase "ratio change" and similar phrases are used to designate a change in the input to output ratio of an automatic transmission. As one of ordinary skill in the art will appreciate, the input to output ratio may be determined based on various input speeds, such as engine speed or turbine shaft speed, in combination with various output speeds, such as wheel speed or output shaft speed, depending upon the particular application. One or more of the input/output speeds may be measured, estimated, or inferred based on various sensors and current operating conditions. A "ratio change" is meant to encompass a change in the input to output ratio which may be effected by a gear shift or control of the torque converter, including the torque converter clutch. In the description of the preferred embodiment, references to upshifts and downshifts are specific to a ratio change which involves a gear shift or selection of a new gear ratio while references to locks/unlocks are specific to a ratio change which controls the torque converter clutch.

System 10 of FIG. 1 includes a vehicular powertrain 12 having an internal combustion engine 14 coupled to an automatic transmission 16. Powertrain 12 may also include a controller 18 in communication with engine 14 and transmission 16 for providing various information and control functions. Engine 14 is connected to transmission 16 via crankshaft 20 which is connected to transmission pump 22 and/or torque converter 24. Preferably, torque converter 24 is a hydrodynamic torque converter including a pump or impeller 26 which is selectively fluidly coupled to a turbine 28. Torque converter 24 may also include a frictional converter clutch or bypass clutch 30 which provides a selective frictional coupling between turbine shaft 32 and input shaft 34.

Transmission 16 includes a plurality of input-to-output ratios or gear ratios effected by various gears, indicated generally by reference numeral 36, and associated frictional elements such as clutches, bands, and the like, as well known in the art. Gears 36, in combination with torque converter 24, provide selective reduction or multiplication ratios between turbine shaft 32 and output shaft 38. Automatic transmission 16 is preferably electronically controlled via one or more shift solenoids, indicated generally by reference numeral 40.

Depending upon the particular application, output shaft 38 may be coupled to one or more axles 42 via a final drive reduction or differential 44 which may include one or more gears, as indicated generally by reference numeral 46. Each axle 42 may include two or more wheels 48 having corresponding wheel speed sensors 50.

Powertrain 12 preferably includes a plurality of sensors, indicated generally by reference numeral 60, in communication with corresponding input ports 62 of controller 18 to sense or monitor the current operating and ambient conditions of powertrain 12. A plurality of actuators, indicated generally by reference numeral 64, communicate with controller 18 via output ports 66.

The sensors preferably include a throttle valve position sensor (TPS) 68 which monitors the angular position of throttle valve 70 which is positioned in intake 72. A mass air flow sensor (MAF) 74 provides an indication of the air mass flowing through intake 72. A temperature sensor (TMP) 76 provides an indication of the engine coolant temperature, or alternatively engine oil temperature.

As also illustrated in FIG. 1, an engine speed sensor (RPM) 80 monitors rotational speed of crankshaft 20. Similarly, a turbine speed sensor (TS) 82 monitors the rotational speed of the turbine 28 of torque converter 24. Another rotational speed sensor, vehicle speed sensor (VSS) 84, provides an indication of the speed of output shaft 38 which may be used to determine the vehicle speed based on the ratio of differential 44 and the size of wheels 48. Of course, wheel speed sensors (WS1 and WS2) 50 may be used to provide an indication of the vehicle speed as well.

An accelerator pedal 52 is manipulated by the driver to control the output of powertrain 12. A pedal position sensor 54 provides an indication of the position of accelerator pedal 52, preferably in the form of counts. In one embodiment, an increasing number of counts corresponds to a request for increasing powertrain output. Preferably, redundant position sensors are used with at least one sensor having a negative slope such that a decreasing number of counts corresponds to a request for increased powertrain output. A manifold absolute pressure (MAP) sensor may be used to provide an indication of the current barometric pressure and manifold pressure.

Actuators 64 are used to provide control signals or to effect movement of various devices in powertrain 12. Actuators 64 may include actuators for timing and metering fuel (FUEL) 90, controlling ignition angle or timing (SPK)92, setting the amount of exhaust gas recirculation (EGR) 94, and adjusting the intake air using throttle valve 70 with an appropriate servomotor or actuator (TVA) 96. Automatic transmission 16 may be selectively controlled by controlling transmission pump or line pressure using an appropriate actuator (PP) 98 in combination with shift solenoids (SS1 and SS2) 40 which are used to select an appropriate gear ratio. Automatic transmission 16 preferably includes a torque converter clutch 30 operable via an appropriate actuator or solenoid (CC) 104. Also preferably, a temperature senor 106 is provided to determine the transmission oil temperature (TOT).

Controller 18 is preferably a microprocessor-based controller which provides integrated control of engine 14 and transmission 16 of powertrain 12. Of course, the present invention may be implemented in a separate engine or transmission controller depending upon the particular application. Controller 18 includes a microprocessor 110 in communication with input ports 62, output ports 66, and computer readable media 112 via a data/control bus 114. Computer readable media 112 may include various types of volatile and non-volatile memory such as random access memory (RAM) 116, read-only memory (ROM) 118, and keep-alive memory (KAM) 120. These "functional" descriptions of the various types of volatile and non-volatile storage may be implemented by any of a number of known physical devices including but not limited to EPROMs, EEPROMs, PROMs, flash memory, and the like. Computer readable media 112 includes data representing instructions executable by microprocessor 110 to implement the method for scheduling ratio changes based on powertrain output torque according to the present invention.

Figure 2:
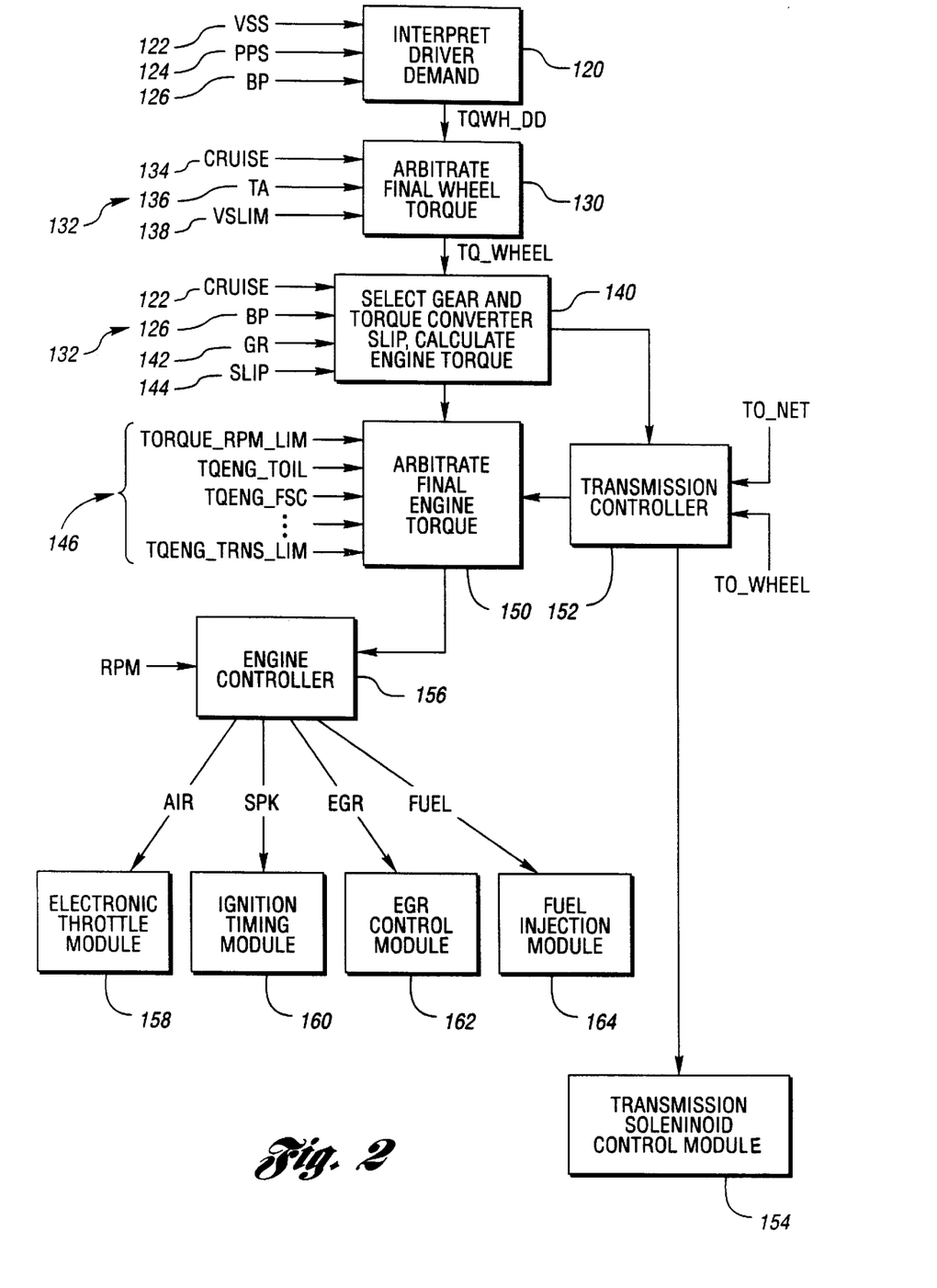
FIG. 2 is a block diagram illustrating an output torque based powertrain control strategy including automatic transmission shift scheduling according to the present invention.

FIG. 2 provides a block diagram for a modular control architecture including wheel torque based transmission ratio selection according to the present invention. A driver demand is interpreted as represented by block 120 based on the vehicle speed 122 accelerator pedal position 124 and barometric pressure 126. The driver demand wheel torque (TQWH_DD) is provided as an input to block 130 which arbitrates the final wheel torque among various other torque requesters, indicated generally by reference numeral 132. Such torque requesters may include, for example, a cruise control torque 134, a traction assist torque 136, and/or a vehicle speed limiting torque 138. Block 130 selects the appropriate torque depending upon the current operating conditions and provides this final wheel torque (TQ_WHEEL) to block 140 which performs a number of functions including scheduling the gear ratio and determining a value for the speed ratio of the torque converter according to the present invention. Block 140 may also include calculation of an engine torque based on the final wheel torque (TQ_WHEEL). Inputs used in these determinations include vehicle speed 122, barometric pressure 126, current gear ratio 142, and current torque converter slip 144 or torque converter speed ratio. Selection or scheduling of the appropriate gear ratio is explained in greater detail below.

The engine torque requested from block 140 is arbitrated with various other engine torque limiting functions 146 as represented by block 150. Transmission controller 152 may also request torque limiting or modulation to provide cancellation of the inertia phase to improve shift feel. Transmission controller 152 communicates with transmission solenoid control module 154 which energizes the appropriate shift solenoids to effect the ratio change.

The final engine torque determined by block 150 is communicated as a desired engine torque to engine controller 156. The engine controller determines the appropriate air flow, spark, EGR, and fuel as represented by blocks 158, 160, 162, and 164, respectively, to achieve the desired engine torque.

While the present invention is described with reference to a desired wheel torque, one of ordinary skill in the art will recognize that the present invention could be easily applied to a system which uses a desired tractive effort, wheel power, or transmission output shaft torque while providing similar benefits in fuel economy, modularity, and drivability.

Figure 3:
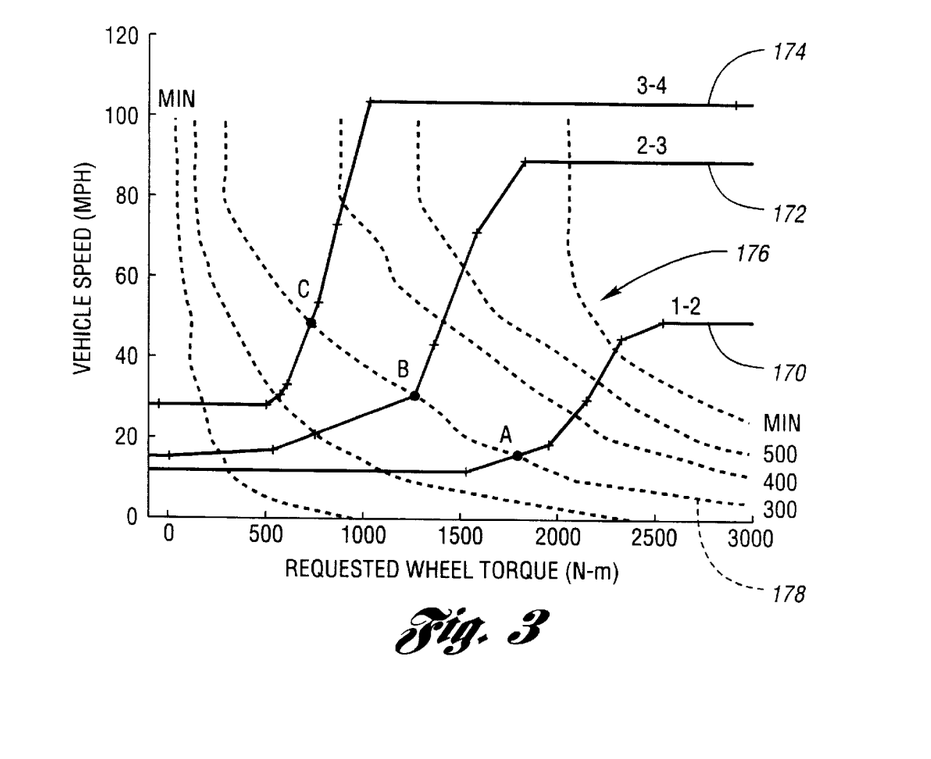
FIG. 3 is a graph illustrating a base or reference output torque based shift schedule according to the present invention.

FIG. 3 is a graph illustrating an exemplary shift schedule for a reference barometric pressure, such as sea level. The schedule plots vehicle speed as a function of requested wheel torque. The 1-2 shift line or shifting threshold is indicated generally by reference numeral 170. The shifting lines for the 2-3 and 3-4 upshifts are indicated by reference numerals 172 and 174. Lines of constant accelerator pedal position are indicated generally by reference numeral 176. As an example, if the driver depresses the accelerator pedal to generate 300 counts as represented by line 178, the corresponding requested wheel torque would be approximately 3000 Nm for a vehicle speed of about five mph. The vehicle would begin accelerating along the 300 count line 178. When the vehicle speed, which may be the actual speed or a filtered predicted vehicle speed, exceeds the corresponding 1-2 shift threshold, a 1-2 shift is commanded as indicated at point A where the vehicle speed is approximately 15 mph. The vehicle continues to accelerate with the requested wheel torque decreasing until the current vehicle speed exceeds the 2-3 shifting threshold (line 172) at point B where a 2-3 upshift is commanded. Similarly, a 3-4 upshift is commanded when the vehicle speed exceeds approximately 50 mph as represented by point C.

Figure 4:
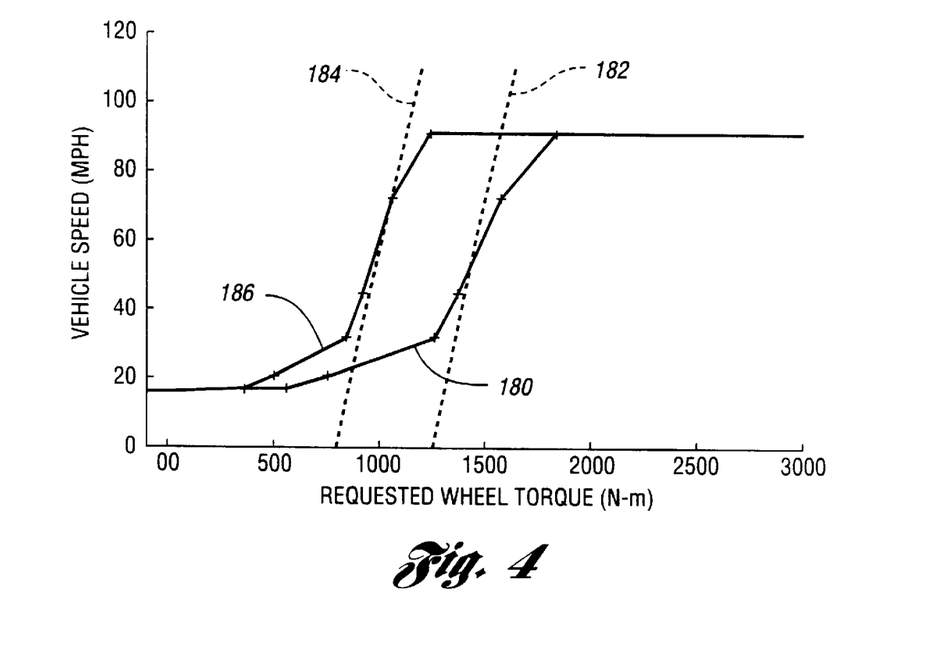
FIG. 4 is a graph illustrating an output torque based shift schedule scaled for barometric pressure according to the present invention.

Referring now to FIG. 4, a graph illustrating a shift schedule scaled for barometric pressure is shown. The available wheel torque is scalable to the current barometric pressure just as available engine torque is scalable to barometric pressure. Line 180 represents a 2-3 shifting threshold at a reference barometric pressure, such as 30" Hg. Line 182 represents the available wheel torque in third gear for the engine at maximum torque, i.e. 29.9" Hg of engine manifold absolute pressure (MAP), assuming a locked torque converter clutch. If the ambient barometric pressure is reduced to 25" Hg, then maximum available wheel torque is also reduced and is represented by reference line 184. A corresponding scaling of the shifting threshold is then necessary to provide consistent performance. As such, the shifting threshold is scaled accordingly to produce a modified shifting threshold represented by line 186. This scaling is accomplished by multiplying the input values of the wheel torque schedules by a scale factor of the ratio of maximum engine torques corresponding to the barometric pressure reference lines 182 and 184 while leaving the output vehicle speed values the same.

Because the shifting thresholds, along with other vehicle calibrations, are typically stored in read-only memory (ROM), they cannot be easily changed during control of the powertrain. Furthermore, due to limited memory, it is desirable to minimize the number of unique schedules or tables to account for various operating and ambient conditions. As such, rather than providing a number of shift schedules corresponding to various barometric pressures, the present invention multiplies the input or index to the reference schedule by a function which is dependent on barometric pressure. Preferably, this function is implemented as a lookup table corresponding to the particular ratio change, i.e. a separate table for each upshift and each downshift, to achieve the same result as having barometric pressure specific tables while minimizing the use of memory. This also results in reduced time for development and validation testing in that a smaller number of calibrations needs to be generated and tested.

Figure 5:
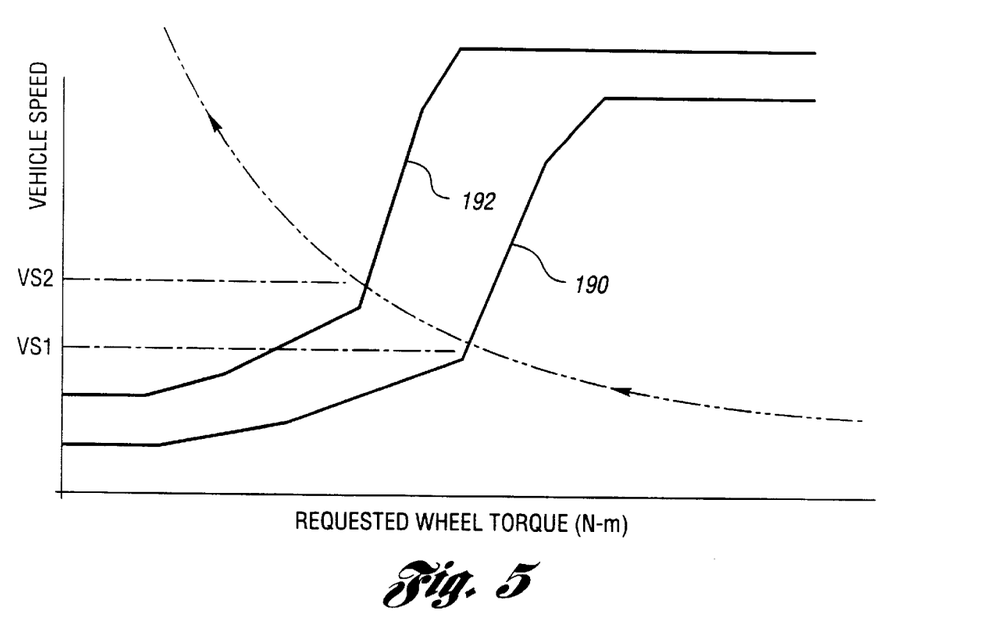
FIG. 5 is a graph illustrating an output torque based shift schedule using scaled and offset values for barometric pressure according to the present invention.

To provide further compensation or adjustment for each upshift and downshift schedule, the present invention preferably includes a vehicle speed adder or offset used to adjust the shifting threshold. FIG. 5 is a graph illustrating a fully compensated 2-3 shift schedule including barometric pressure scaling and a vehicle speed adder which is also based on barometric pressure. The graph of FIG. 5 plots vehicle speed as a function of requested wheel torque. The reference shifting threshold 190 is compensated for barometric pressure variation resulting in a compensated threshold line 192. The values for the fully compensated shifting threshold 192 are determined by first determining a requested final wheel torque based in part on the accelerator pedal position. The current gear ratio is determined, along with the barometric pressure, to select an appropriate upshift or downshift threshold. The final wheel torque (TQ_WHEEL) is compensated for the current barometric pressure and used to determine a first shifting threshold which is accessed by the barometric pressure compensated final wheel torque, similar to that illustrated in FIG. 4. The barometric pressure vehicle speed adder is then determined using the uncompensated final wheel torque, and a scaling factor based on the current barometric pressure. The adder is combined with the first threshold to determine the shifting threshold as represented by line 192. In one embodiment of the present invention, an additional vehicle speed adder may be included which is determined as a function of the transmission oil temperature (TOT). Preferably, the oil temperature adder is added only to the downshift schedules. Of course, an oil temperature adder may be applied to upshift, downshift, or converter lock/unlock thresholds depending upon the particular application. Finally, the resulting threshold may be scaled for ambient temperature to accommodate slower engine and transmission response times in colder temperatures.

As one of ordinary skill in the art will recognize, the upshift schedules illustrated have corresponding downshift schedules or thresholds which include sufficient hysteresis to prevent oscillation or rapid shifting. Likewise, the torque converter lock/unlock schedules include analogous features to compensate for changes in barometric pressure, vehicle speed, and transmission oil temperature as described in greater detail below.

Figure 6:
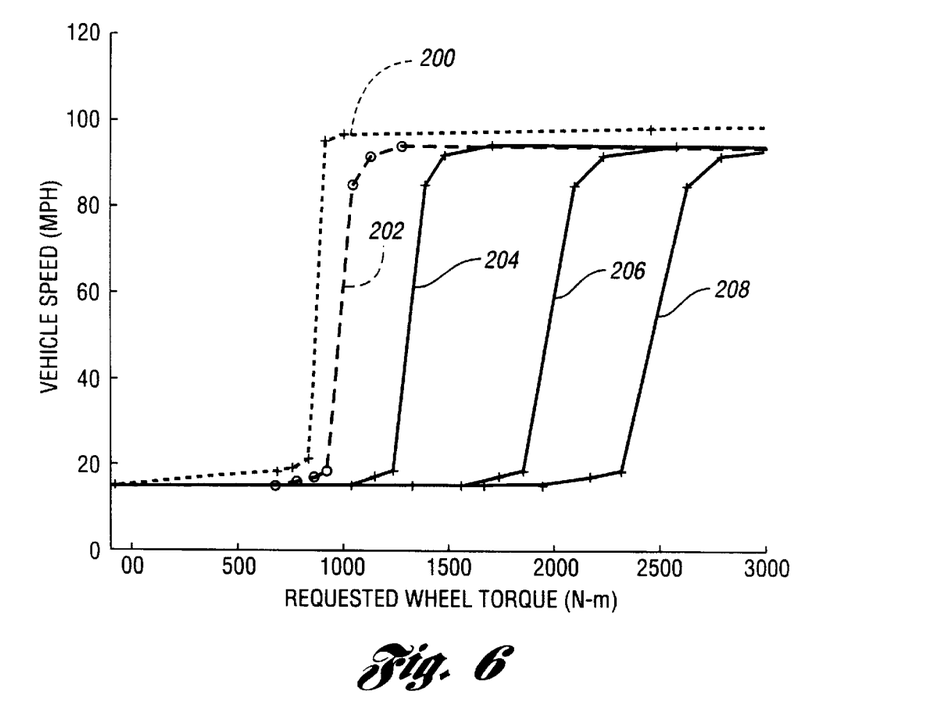
FIG. 6 is a graph illustrating an increasing transmission oil temperature (TOT) torque converter clutch schedule according to the present invention.

FIG. 6 is a graph illustrating a torque converter clutch schedule for locking and unlocking the converter clutch in a particular gear, such as third gear. The graph of FIG. 6 plots vehicle speed as a function of requested wheel torque to illustrate the variation of the converter lock/unlock schedules as a function of transmission oil temperature (TOT). Line 200 represents the torque converter clutch threshold to apply, or lock, the converter clutch. Lines 202, 204, 206, and 208 illustrate the unlock thresholds for increasing transmission oil temperature. For example, line 202 may represent a first oil temperature such as 200° F. or less. Line 204 corresponds to a second temperature, such as 210° F., while lines 206 and 208 correspond to 220° F. and 230° F., respectively. Thus, as TOT increases, it is progressively more difficult to unlock the converter clutch. This facilitates cooling of the transmission by increasing the lock/unlock hysteresis when the TOT temperature reaches undesirable levels. As illustrated in FIG. 6, once the torque converter clutch is locked, the unlock due to an increase in the accelerator pedal position is progressively more difficult to achieve as the TOT increases. This facilitates cooling by minimizing the number of unlocks where torque converter multiplication causes TOT to increase. A similar schedule, such as illustrated in FIG. 6, may be provided for each of the transmission gears where a torque converter clutch lock/unlock may be commanded.

Figure 7:
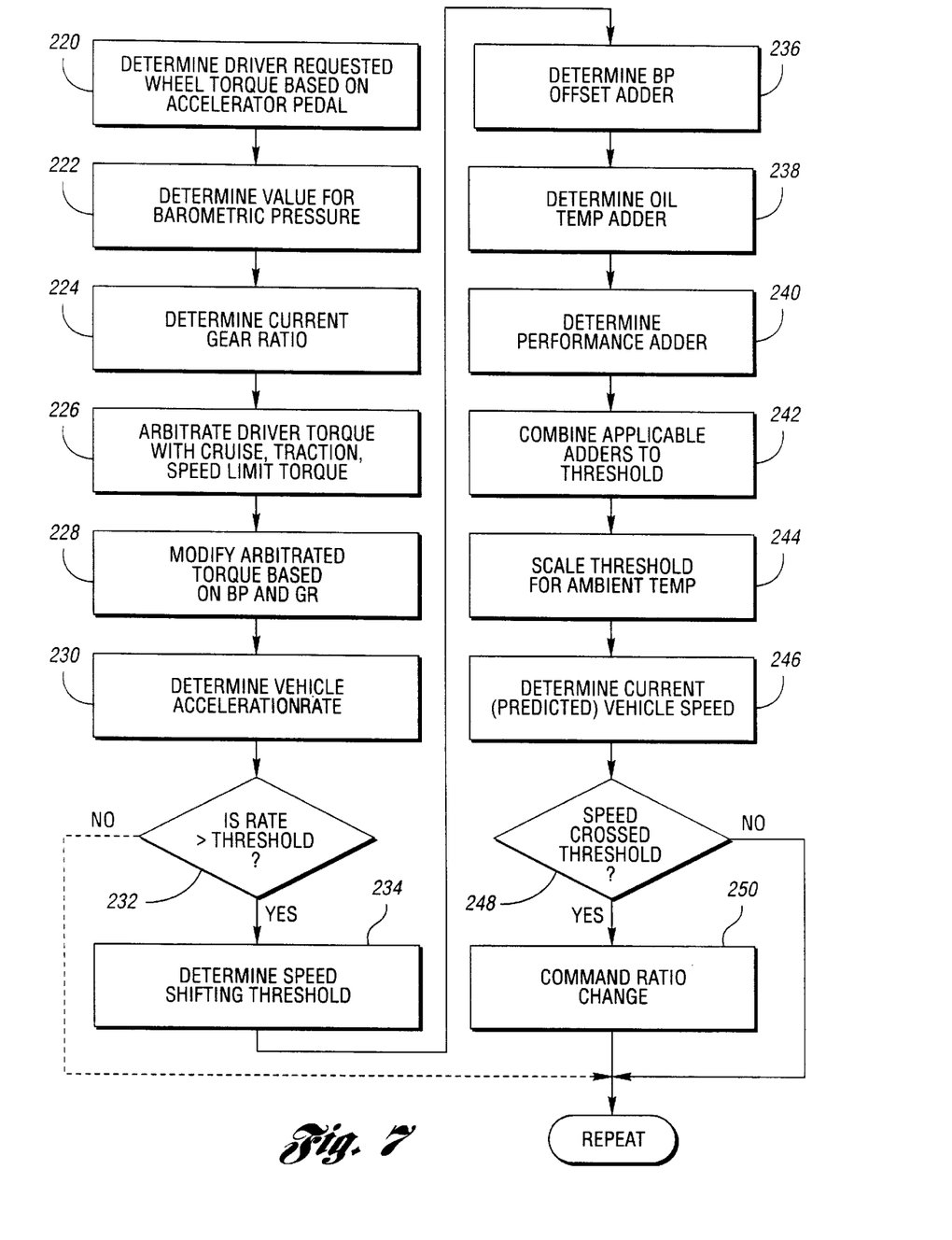
FIG. 7 is a flowchart illustrating control logic for use in a system and method for output torque based shift scheduling and compensation according to the present invention.

Referring now to FIG. 7, a flowchart illustrating control logic of one embodiment of the system or method according to the present invention is shown. As will be appreciated by one of ordinary skill in the art, the flowchart illustrated in FIG. 7 may represent any of a number of known processing strategies such as event-driven, interrupt-driven, multitasking, multi-threading, and the like. As such, various steps or functions illustrated may be performed in the sequence illustrated, in parallel, or in some cases omitted. Likewise, the order of processing is not necessarily required to achieve the objects, features, and advantages of the invention, but is provide for ease of illustration and description. In particular, those functions illustrated in dashed lines are optional depending upon the particular application or operating conditions. Preferably, the control logic is implemented in software which is executed by a microprocessor-based controller. Of course, the control logic may be implemented in software, hardware, or a combination of software and hardware.

Block 220 of FIG. 7 represents determination of the driver requested wheel torque based, at least in part, on the accelerator pedal position. As illustrated in FIG. 2, the driver requested wheel torque is preferably determined based on barometric pressure, accelerator pedal position, and preferably vehicle speed. Of course, any rotational speed representing current operating conditions may also be used, such as the output shaft rotational speed, wheel speed, engine speed, or the like. Likewise, the current turbine speed may be used in conjunction with the output shaft speed to determine the current gear ratio. Similarly, rather than requested wheel torque, other powertrain output parameters which may be utilized to determine the requested powertrain output include engine torque, wheel power, tractive effort, and output shaft torque. A value indicative of the current barometric pressure is determined as represented by block 222. An appropriate sensor, such as a MAP sensor, may be used to determine the current barometric pressure. Alternatively, a value may be inferred or calculated from various other sensors or parameters.

The current gear, gear ratio, or input-to-output ratio is determined as represented by block 224. The current gear may be indicated by an appropriate sensor, by the status of the shift solenoids, or by calculating an actual input-to-output ratio based on engine speed (or turbine speed to eliminate the contribution of the torque converter) and output shaft speed. Preferably, block 224 represents determination of a discrete gear used to select one of a plurality of lookup tables or stored parameters.

The driver requested torque is arbitrated with various other torque requesters, such as cruise control, traction control, and vehicle speed limiting torques to determine a final requested wheel torque as represented by block 226. The final requested wheel torque is modified based on the current barometric pressure and gear ratio as represented by block 228. In a preferred embodiment, a lookup table corresponding to the current gear ratio or ratio change, i.e., a 1-2 upshift or 4-3 downshift, is accessed based on the current barometric pressure to determine a speed shifting threshold as represented by block 234.

In one embodiment, blocks 230 and 232 represent optional processing steps which may be completed depending upon the particular upshift or downshift, or the particular application. Blocks 230 and 232 are provided to reduce "shift busyness" or powertrain hunting under demanding conditions. For example, when ascending a steep grade and/or when driving at higher altitudes (lower barometric pressures), gear changes become more sensitive to minor changes in accelerator pedal position or requested wheel torque. To reduce or eliminate excessive gear changes, block 230 determines the current vehicle acceleration rate and compares this rate to a corresponding threshold as represented by block 232. Preferably, the corresponding threshold is stored in a lookup table for each particular ratio change. The acceleration rate must exceed the corresponding threshold before the normal upshift schedule is applied.

Once the vehicle speed shifting threshold for the current upshift or downshift is determined as represented by block 234, various vehicle speed offsets or adders may be calculated as represented by blocks 236, 238, and 240. A barometric pressure adder is determined based on the current barometric pressure as represented by block 236. A transmission oil temperature adder is determined as represented by block 238. In a preferred embodiment, the transmission oil temperature adder is combined only with the downshift thresholds. Of course, the transmission oil temperature adder may also be used in conjunction with other ratio changes including upshifts, and torque converter locks/unlocks depending upon the particular application. A performance adder, which may be used to fine-tune the shift schedule, is determined as represented by block 240.

The applicable adders are combined with the vehicle speed shifting threshold as represented by block 242. The resulting shifting threshold may then be scaled by an ambient temperature or transmission oil temperature factor as represented by block 244. This scale factor compensates for increased viscosity of engine and transmission oil and various other losses which are more prevalent during cold starts.

The current vehicle speed is determined as represented by block 246. The vehicle speed may be a predicted vehicle speed to account for delays in the control and actuation of the ratio change. Block 248 determines whether the current vehicle speed has crossed the appropriate threshold, i.e. is greater than the threshold for an upshift or less than the threshold for a downshift. When the shifting threshold is crossed, a ratio change is commanded as represented by block 250. Processing is then repeated preferably at predetermined time intervals as represented by block 252.

While the best mode for carrying out the invention has been described in detail, those familiar with the art to which this invention relates will recognize various alternative designs and embodiments for practicing the invention as defined by the following claims.

What is claimed is:

1. A method for controlling a vehicular powertrain including an internal combustion engine and an automatic transmission having a plurality of selectable input to output speed ratios, and a controller in communication with the internal combustion engine, the transmission, and an accelerator pedal, the method comprising:

determining a driver requested wheel torque based on position of the accelerator pedal;

determining a value indicative of current barometric pressure;

determining a current input to output speed ratio;

modifying the driver requested wheel torque based on the current barometric pressure and the current input to output speed ratio to determine a compensated wheel torque;

determining a vehicle speed ratio-changing threshold based on the compensated wheel torque and the current input to output speed ratio;

determining a current vehicle speed;

comparing the current vehicle speed to the vehicle speed ratio-changing threshold; and generating a command to change the input to output speed ratio when the current vehicle speed crosses the vehicle speed ratio-changing threshold wherein the selected ratio is based on the compensated wheel torque.

2. The method of claim 1 wherein the step of determining a current vehicle speed comprises predicting a future vehicle speed to account for delay between generating the command to change input to output speed ratios and an actual change in the input to output speed ratio.

3. The method of claim 1 wherein the step of determining a vehicle speed ratio-changing threshold comprises:

determining a reference vehicle speed ratio-changing threshold based on the compensated wheel torque and the current input to output speed ratio;

determining a barometric pressure offset based on the requested wheel torque and the value indicative of the current barometric pressure; and combining the offset with the reference vehicle speed ratio-changing threshold to determine the vehicle speed ratio-changing threshold.

4. The method of claim 3 further comprising:

determining oil temperature within the automatic transmission; and scaling the vehicle speed ratio-changing threshold based on the oil temperature before comparing the ratio-changing threshold to the current vehicle speed.

5. The method of claim 1 further comprising:

determining a current vehicle acceleration rate;

determining an acceleration rate threshold based on the driver requested wheel torque;

comparing the current vehicle acceleration rate to the acceleration rate threshold; and performing the step of comparing the current vehicle speed to the vehicle speed ratio-changing threshold only if the current vehicle acceleration rate exceeds the acceleration rate threshold.

6. A computer readable storage medium having stored therein data representing instructions executable by a computer to control a vehicle powertrain including an electronic throttle control system and an automatic transmission having a plurality of selectable gear ratios, the computer readable storage medium comprising:

instructions for determining a driver requested wheel torque based on position of an accelerator pedal;

instructions for determining a value indicative of current barometric pressure;

instructions for determining a current gear ratio;

instructions for modifying the driver requested wheel torque based on the value indicative of the current barometric pressure and the current gear ratio to determine a compensated wheel torque;

instructions for determining a vehicle speed shifting threshold based on the compensated wheel torque and the current gear ratio;

instructions for determining a current vehicle speed;

instructions for comparing the current vehicle speed to the vehicle speed shifting threshold; and instructions for generating a command to change gear ratios when the current vehicle speed crosses the vehicle speed shifting threshold, wherein the selected ratio is based on the compensated wheel torque.

7. The computer readable storage medium of claim 6 wherein the instructions for determining a current vehicle speed include instructions for predicting a future vehicle speed to account for delay between generating the command to change gear ratios and an actual change in gear ratio.

8. The computer readable storage medium of claim 6 wherein the instructions for determining a vehicle speed shifting threshold comprise:

instructions for determining a reference vehicle speed shifting threshold based on the compensated wheel torque and the current gear ratio;

instructions for determining a barometric pressure offset based on the requested wheel torque and the value indicative of the current barometric pressure; and instructions for combining the offset with the reference vehicle speed shifting threshold to determine the vehicle speed shifting threshold.

9. The computer readable storage medium of claim 8 further comprising:

instructions for determining oil temperature within the automatic transmission; and instructions for scaling the vehicle speed shifting threshold based on the oil temperature before comparing the shifting threshold to the current vehicle speed.

10. The computer readable storage medium of claim 6 further comprising;

instructions for determining a current vehicle acceleration rate;

instructions for determining an acceleration rate threshold based on the driver requested wheel torque;

instructions for comparing the current vehicle acceleration rate to the acceleration rate threshold; and instructions for performing the step of comparing the current vehicle speed to the vehicle speed shifting threshold only if the current vehicle acceleration rate exceeds the acceleration rate threshold.

* * * * *